United States Patent Office 2,786,823
Patented Mar. 26, 1957

2,786,823

CATIONIC UREA-FORMALDEHYDE RESINS AND PREPARATION THEREOF

Gerald I. Keim, Oxford, Pa., assignor to Hercules Powder Company, Wilmington, Del., a corporation of Delaware No Drawing. Application August 21, 1953,
Serial No. 375,829

15 Claims. (Cl. 260—70)

This invention relates in general to a cationic urea-formaldehyde resin and a process for producing the resin.

An ever important problem in the manufacture of paper has been the preparation of a wet strength paper whereby the paper is resistant to tearing or breaking even when wet. This property of increased strength and particularly wet strength has been imparted to the paper through the incorporation in a paper furnish of a ureaformaldehyde resin, but previously the incorporation of such a resin in the paper furnish has been accomplished by precipitating the resin or by utilizing a resin which has been partly polymerized and which is characterized by being in the gel state or nearly in the gel state with the result that the urea-formaldehyde resin is mechanically entrained on the paper fibers.

More recently, high wet strength and dry strength paper products have been prepared by the addition thereto of a partially polymerized hydrophilic cationic ureaformaldehyde resin which contains as a modifier a water-soluble polyfunctional organic nitrogen base. A description of these resins is contained in U. S. Patent No. 2,554,475 to Tzeng-Jiueq Suen et al.; Canadian Patent No. 467,505 to John H. Daniel, Jr., et al.; in my Canadian Patent No. 468,512; and in my copending application Serial No. 341,889 filed March 12, 1953. These modified resins are substantive to the paper fibers, i. e., they are characterized by substantial exhaustion onto the paper fibers and even distribution thereon without the need of addition of a precipitating or fixing agent. The use of such resins leads to a process for preparing a paper of extraordinarily high strength by a practicable process easily adaptable to existing paper machinery.

In making cationic modified urea-formaldehyde resins, thiourea, or a mixture of urea and thiourea may be used in place of urea, while any methylene-yielding substance, such as paraformaldehyde or hexamethylenetetramine, may be substituted for formaldehyde. The ratio of methylene-yielding substance to urea, thiourea or mixture thereof is not critical. When formaldehyde is used, the preferred ratio is from 1.8 to 2.8 moles of formaldehyde per mole of urea, thiourea or mixture thereof. Hereafter the invention will be discussed in terms of urea and formaldehyde as the primary reactants, but it is understood that any methylene-yielding substance, as stated above, may be used in place of formaldehyde and that either thiourea or mixtures of thiourea with urea may be used in place of urea.

The water-soluble polyfunctional organic nitrogen bases used to modify the urea-formaldehyde resins are alkylenepolyamines of the formula $H_2N(C_nH_{2n}HN)_xH$ in which $n$ is two or more and $x$ is one or more, such as ethylenediamine and 1,3-propylenediamine; and polyalkylenepolyamines such as diethylenetriamine, triethylenetetramine, tetraethylenepentamine; the corresponding polypropylenepolyamines and polybutylenepolyamines; also guanidine, biguanides, the guanylureas, and the salts thereof; condensation products of alkylenepolyamines, such as the above with halohydrins such as α-dichlorhydrin, epichlorhydrin and the like; monoalkylolamines, dialkylolamines, trialkylolamines, and the like, and the water-soluble condensation products thereof with aldehydes such as formaldehyde. The amount of water-soluble polyfunctional organic nitrogen base used may vary widely. Generally from about 3% to about 44% of the polyfunctional organic base based on the weight of the urea is preferred. The polyalkylenepolyamines are the preferred polyfunctional bases for the purpose of this invention.

It is preferred to heat all the ingredients together for a short period of time under alkaline conditions and then for a relatively long period of time under acid conditions until a resin sirup of the desired viscosity is formed. If desired, the alkaline reaction can be omitted and the entire reaction carried out under acid conditions. An alternative procedure for making the resins involves reacting urea and formaldehyde under alkaline conditions followed by addition of the water-soluble polyfunctional organic nitrogen base and reaction under acid conditions until a resin having the desired viscosity is achieved. In general, as set forth in the art, cationic modified urea-formaldehyde resins suitable for use as wet strength resins should have a viscosity of at least about D on the Gardner-Holdt scale when measured at 20° C. on an aqueous solution having 45% solids by weight.

These resins, while representing a great advance over the prior art in flexibility of use on the paper machine and in the quality of the product produced, nevertheless suffer a very serious drawback in that all are characterized by the fact that not more than about 50% of the resin is retained by the paper when the resin is added to the water suspension of paper stock, i. e., at any point of the papermaking machine ahead of the wire or screen. This is clearly shown by Fig. 1 of Canadian Patent No. 467,505. As this is the principal method used commercially to incorporate these resins in paper, this is a serious drawback. Recirculating the white water has not proved a satisfactory answer. Thus, it is necessary to run part of the white water to the sewer in order to prevent the accumulation of dissolved substances in the paper mill systems. These substances, if allowed to accumulate in this manner, tend to cause trouble with foaming, slime growth, poor sizing, and sticking on the press rolls. In addition, it has been found that recirculation of the white water does not result in any saving of urea-formaldehyde resin as would be expected from the amounts of resin present in the white water.

Now in accordance with the present invention there has been discovered a cationic modified urea-formaldehyde resin which is substantially completely retained by the paper when added to a water suspension of paper fibers and a process for producing this resin. It is possible by using the resins of the instant invention to obtain the same wet strength as obtained with the prior art cationic urea-formaldehyde resins with the use of only about one-half the instant resins as was necessary with prior art resins. Conversely, it is possible to obtain approximately a 30% increase in wet strength by using the same amount of the instant resin to treat paper as of the prior art resin.

These highly efficient cationic urea-formaldehyde resins are prepared by treating an aqueous solution of a cationic urea-formaldehyde resin modified by a water-soluble polyfunctional organic nitrogen base, which resin has been produced by any of the methods set forth above, with an appropriate anion, namely, a sulfate ion. The anion is added in the form of a water-soluble salt or in the form of the acid. Suitable water-soluble sulfates are the alkali metal sulfates as well as the sulfates of magnesium, manganese, iron, zinc, aluminum, beryllium, tin, gallium, zirconium, nickel, cadmium, copper, cerium, chromium, cobalt, etc.; ammonium sulfate; the alkali metal alkyl sulfates, etc. The term "sulfate" as used herein means any source of sulfate ions and thus includes both water-soluble salts and sulfuric acid. As a result of this treatment, a fraction of the original resin is precipitated.

This precipitate may be separated by any of the processes known to those skilled in the art such as filtering, centrifuging or allowing the precipitate to settle and then either decanting the supernatant liquid or draining off the lower layer. The resin so separated has been found to be substantially completely retained on the paper fibers when used in the so-called beater addition process. The yield of precipitate may be varied from about 20% to about 60% of the starting resin solids by varying the temperature, the concentration of the anion, and the dilution and nature of the starting cationic resin.

The filtrate which contains the unprecipitated resin may be treated to produce further amounts of cationic urea-formaldehyde resin which may then be treated in accordance with this invention. Thus, to the filtrate is added a concentrated form of formaldehyde such as paraformaldehyde, dimethylolurea or a concentrated solution of formaldehyde which has been stabilized with urea (such a solution is marketed by the E. I. du Pont de Nemours & Company under the trade name of "Arboneeld B"). Sufficient urea is added along with the formaldehyde to maintain the desired urea-formaldehyde ratio, and additional amounts of water-soluble polyfunctional organic nitrogen base modifier are also added. By this means the solution is adjusted to about 40% to about 50% solids with from about 43% to about 45% solids preferred. This solution is then polymerized in a manner similar to that used in preparing the original resin.

It has been found that the resins obtained by reworking the unprecipitated fractions produced in the process of the instant invention give approximately the same proportion of precipitated resin when processed in the instant process as do those resins which do not contain any reworked fractions. Thus, substantially none of the cationic modified urea-formaldehyde resin is lost either in producing the more highly efficient resins of the instant invention or in the papermaking process wherein the resin is used to produce a paper of exceptionally high wet strength.

The resins treated in accordance with the process of the instant invention are cationic. The exact nature of the resin produced by the process of the instant invention is not fully known. However, it is known that the resin so produced is itself cationic and has the highly unusual property of being substantially completely retained by the paper fibers.

The general nature and form of the invention having been set forth and described the following examples are presented in illustration but not in limitation of the invention. All parts and percentages are by weight unless otherwise specified. Where no temperature is specified, room temperature was used.

EXAMPLE 1

A solution was prepared containing 864 parts of urea and 2,608 parts of 37% formaldehyde which was methanol-free. To this was added 116.8 parts of triethylenetetramine. The solution was refluxed for 5 minutes and 80 parts of 90% formic acid were added. The solution was again heated to reflux (about 102° C.) and maintained at this temperature until the viscosity as determined on a 44% aqueous solution had risen to U-V on the Gardner-Holdt scale. The solution was then cooled and neutralized with sodium hydroxide to stop further polymerization. The resin solution so produced was diluted to about 30% solids. One portion of this solution was put aside for use as a control.

To 50 parts of another portion of the resin solution were added 12 parts of a 28% solution of sodium sulfate. The mixture was allowed to stand at 20° C. for 5 minutes. Then the upper layer was decanted and the lower layer containing about 60% of the resin solids was dissolved in 480 parts of water which had been adjusted to a pH of 3.0 with formic acid.

The resin fraction so obtained together with the control were evaluated as a beater additive on a bleached sulfite pulp. It was found that 1% of the resin prepared by precipitation with sodium sulfate was as effective as 2% of the original untreated resin in producing a high wet strength in paper.

EXAMPLE 2

Five hundred parts of the cationic urea-formaldehyde resin produced in Example 1 were diluted with 1,170 parts of water. To the resulting solution was added 240 parts of a 13% solution of sodium sulfate. A precipitate formed and was allowed to settle overnight. The upper layer was then decanted, and the lower layer containing 96.3 parts of a resin sludge was dissolved in water containing sufficient formic acid to give a pH of 3.0 to produce a 2% solution of the resin. Another portion of the resin solution produced in Example 1 was used as a control. The control and the treated resin were then added in varying amounts to a bleached sulfite pulp which had been beaten to a Schopper-Riegler freeness of 750 cc. and which had been adjusted to a pH of 4.5 with papermaker's alum. The treated pulp was then formed into handsheets having a basis weight of 40 lbs./ream. The sheets were then cured in an oven at 105° C. for one hour before being tested. Strips of the cured paper were soaked in distilled water for 24 hours and then tested for tensile strength. The amount of resin present in the paper based on the dry pulp and the wet strength of the resulting paper are given in the following table:

*Table I*

| Test No. | Type of Resin | Percent Resin | Wet Tensile Strength (lb./in.) |
|---|---|---|---|
| 1 | Control resin | 0.5 | 4.2 |
| 2 | Precipitated resin | 0.5 | 5.7 |
| 3 | Control resin | 1.0 | 6.4 |
| 4 | Precipitated resin | 1.0 | 8.0 |
| 5 | Control resin | 3.0 | 9.8 |
| 6 | Precipitated resin | 3.0 | 10.8 |

EXAMPLES 3 AND 4

Fifty parts of the resin solution produced in Example 1 were treated with 12 parts of a 33% solution of sodium sulfate. The temperature of the mixture was held at 20° C. during precipitation. Example 4 differed from Example 3 in that, in Example 4, 25 parts of additional water were added to the 50 parts of resin solution. In Example 3 a total of 10.4 parts of precipitate were obtained, while in the diluted resin sirup of Example 4 only 7.6 parts of precipitate were obtained.

The resin fractions so obtained were evaluated as beater additives on a bleached sulfite pulp. It was found that the resin prepared by precipitation with sodium sulfate was about twice as effective as the original untreated resin in producing high wet strength in paper.

EXAMPLE 5

To 100 parts of the resin solution produced in Example 1 was added 10% sulfuric acid to adjust the pH to 3.0. The solution was then diluted with 100 parts of water and cooled to 4° C. A precipitate formed. The supernatant liquid was decanted. The precipitate so obtained represented 40% of the starting resin solids.

The resin fraction so obtained was evaluated as a beater additive on a bleached sulfite pulp. It was found that the resin prepared by precipitation with sulfuric acid was about twice as effective as the original untreated resin in producing high wet strength in paper.

EXAMPLE 6

Three 100-part portions of the 30% resin solution prepared in Example 1 were diluted with varying amounts of water. To each solution was then added 100 parts of a 10% aqueous solution of aluminum sulfate. The mixture was held at 10° C. while a precipitate formed and settled out to the bottom of the mixture. The supernatant liquid was decanted and the amount of resin sludge so obtained was determined. The resin sludges so obtained all had a solids content of about 30%. The following table sets forth the amount of water used to dilute the different resin solutions and the amount of resin sludge obtained in each case.

Table II

| Resin Solution No. | Parts of Dilution Water | Parts of Resin Sludge Obtained |
|---|---|---|
| 1 | 100 | 31 |
| 2 | 200 | 25 |
| 3 | 300 | 20 |

The resin fractions so obtained were evaluated as beater additives in a bleached sulfite pulp in comparison with the control using the untreated resin solution. It was found that the resin prepared by precipitation with aluminum sulfate was about twice as effective as the original untreated resin in producing a high wet strength in paper.

The quantity of highly efficient cationic modified urea-formaldehyde resin obtained in accordance with the instant invention may be varied by (1) diluting the resin solution to a lower solids content; (2) varying the temperature of the resin solution; or (3) to some extent, varying the concentration of anion.

The amount of sulfate ion used is not critical as can be seen in the examples. In general, the minimum amount of sulfate ion which should be used is that amount which will cause a substantial amount of the resin solids to precipitate, while the maximum amount of sulfate ion is limited either by the solubility of the sulfate or by the amount which will interfere with reworking the filtrate. For most purposes, the amount of sulfate may vary from about 3% to about 100%, based on the weight of the dry resin solids. It is understood, of course, that the exact amount which should be used will vary with the nature of the resin, the nature of the sulfate, the concentration of the resin and the temperature at which fractionation is carried out. The optimum conditions of concentration of sulfate and resin will, in any instance, be varied to suit commercial convenience.

When the sulfate is added in the form of sulfuric acid, the insolubilizing effect of the sulfate ion is partially offset by the solubilizing properties of the hydrogen ion. In the case of the more insoluble cationic urea-formaldehyde resins, such as those prepared with dicyandiamide as the modifier, the solubilizing tendencies of the hydrogen ion may be largely ignored. However, in the case of the more soluble resins, such as those modified by the polyalkylenepolyamines, it is necessary to observe certain precautions in order to obtain an efficient fractionation. Thus, it is necessary in the resins ordinarily used in the art to use exceptionally low temperatures for the fractionation and/or have the resin present in the form of a relatively concentrated solution.

Alternatively, it is possible to modify the preparation of the cationic urea-formaldehyde resin so that the ordinarily highly soluble resins may be efficiently fractionated with the aid of sulfuric acid. Thus, the amount of more soluble modifier may be decreased from the amount ordinarily used. The amount of formaldehyde also may be lowered from that customarily employed, and, further, a lower temperature of polymerization may be used. The use of any or all of these modifications will result in a resin having a lower solubility than would otherwise be obtained. Such a resin is more easily fractionated with sulfuric acid. When the sulfate is present in the form of a salt, no such precautions are necessary for obtaining an efficient fractionation.

While as set forth above, when sulfuric acid is used lower temperatures are preferred, with sulfate salts the temperature generally may vary anywhere from the freezing point of the resin solution to about 80° C. For commercial convenience, it is generally preferred to use a temperature between about 5° C. and room temperature, i. e., up to about 35° C.

The concentration of the resin solution which is to be fractionated likewise may vary widely. In general, any concentration between the maximum solubility of the resin and about 5% solids by weight may be used. It is preferred to use a concentration between that at which the resin is produced (about 45% solids, by weight) and about 10% solids by weight.

In the process of the instant invention, diluting the resin before or after addition of the sulfate reduces the quantity of precipitate obtained. Cooling of the resin solution, on the other hand, increases the quantity of precipitate obtained. By varying these factors it is possible to vary the amount of precipitate taken out in any one treatment.

The highly efficient wet strength resins of the present invention may be used as such to prepare paper having high wet strength or they may be blended with any of the prior art cationic wet strength resins to produce a product of improved efficiency. The precipitated resins may be converted to a solution by acidifying with an acid such as formic acid and adding additional water as needed. To assure a reasonable shelf-life it is preferred that the solution have a solids content of not greater than about 30% by weight. When the resin is to be used immediately, a higher solids content may, of course, be used.

I claim:

1. A process for treating a hydrophilic cationic urea-formaldehyde-polyfunctional organic nitrogen base resin to form a resin of improved properties in producing wet strength paper which consists in forming an aqueous solution of such a urea-formaldehyde resin in which the amount of polyfunctional organic nitrogen base is from about 3% to about 44% of the weight of the urea, said resin containing a fraction precipitable therefrom in said aqueous solution by dispersing sulfate ions therein, dispersing sulfate ions in the solution to thereby cause said fraction to precipitate, and separating the resulting precipitate.

2. A process according to claim 1 wherein the sulfate ion is supplied by sodium sulfate.

3. A process according to claim 1 wherein the sulfate ion is supplied by aluminum sulfate.

4. A process according to claim 1 wherein the sulfate ion is supplied by magnesium sulfate.

5. A process according to claim 1 wherein the sulfate ion is supplied by iron sulfate.

6. A process according to claim 1 wherein the polyfunctional organic nitrogen base is an alkylenepolyamine.

7. The process according to claim 6 wherein the alkylenepolyamine is ethylenediamine.

8. A process according to claim 1 wherein the polyfunctional organic nitrogen base is a polyalkylenepolyamine.

9. The process according to claim 8 wherein the polyalkylenepolyamine is diethylenetriamine.

10. The process according to claim 8 wherein the polyalkylenepolyamine is triethylenetetramine.

11. The process according to claim 8 wherein the polyalkylenepolyamine is tetraethylenepentamine.

12. The process according to claim 10 wherein the sulfate ion is supplied by sodium sulfate.

13. The process according to claim 10 wherein the sulfate ion is supplied by aluminum sulfate.

14. The process according to claim 10 wherein the sulfate ion is supplied by magnesium sulfate.

15. The process according to claim 10 wherein the sulfate ion is supplied by iron sulfate.

References Cited in the file of this patent

UNITED STATES PATENTS

| | | |
|---|---|---|
| 1,951,994 | Rochet | Mar. 20, 1934 |
| 2,642,360 | Mackinney et al. | June 16, 1953 |
| 2,657,132 | Daniel et al. | Oct. 27, 1953 |